Patented Sept. 12, 1933

1,926,247

UNITED STATES PATENT OFFICE 1,926,247

METHOD OF PRODUCING EMULSIONS

Preston R. Smith, Rahway, N. J., assignor to The Barber Asphalt Company, Philadelphia, Pa., a corporation of West Virginia No Drawing. Application April 11, 1930
Serial No. 443,632

9 Claims. (Cl. 134—1)

My invention relates to emulsions and method of producing and more particularly relates to asphalt emulsions.

Asphalt emulsions comprising natural and artificial asphalt dispersed in an aqueous dispersing medium, have been heretofore produced and have been found of substantial value for various purposes, as, for example, binders, adhesives, coating compositions, and in the making and patching of roadways, etc.

In the production of asphalt emulsions heretofore, it has been known to use a large variety of dispersing agents, or protective colloids as, for example, soaps, saponacious materials, proteins, pectins, polysaccharides, hemicelluloses, gums, tannins, clays, etc., but such dispersing agents as have heretofore been used, and the emulsions produced thereby, have been found to be open to objection in that emulsions of high stability are not produced, and under certain conditions, as where the water used is hard, i. e. contains relatively large amounts of calcium or magnesium salts, it is frequently impossible to prepare stable emulsions with certain dispersing agents unless an excessive amount of dispersing agent is used. Further, many of the heretofore known dispersing agents, as soaps, gums, etc., are such excellent frothing agents that the emulsions made with them are initially largely foam and must be stored until the foam has subsided before they can be packaged. Further, as is well known, asphalt emulsions in use are usually dried out, i. e. the water eliminated by evaporation, and hence the dispersing agent remains in the asphalt and frequently has a deleterious effect on the asphalt, or its presence is undesirable.

Now, in accordance with my invention, I have discovered that if asphalt be dispersed in an aqueous solution containing a tri-alkali phosphate that an excellent emulsion of high stability may be produced, and even with the use of water of a hardness such as to render it unusable for the production of emulsions by prior methods. Further, in accordance with my invention, I have discovered that under certain conditions the inclusion of an alkali borate in the dispersing medium, in addition to a tri-alkali phosphate, will insure the stability of emulsions even when very substantially diluted.

In accordance with my invention I may use as the tri-alkali phosphate, for example, trisodium phosphate, (crystalline or dehydrated), tri-ammonium phosphate, and the like, and as the alkali borate, when used, I may use, for example, borax, potassium tetraborate and the like; and either the tri-alkali phosphate alone, or with an alkali borate may be included in an aqueous dispersing medium containing heretofore known emulsifying agents, or protective colloids.

In the practical adaptation of my invention, I have found that the tri-alkali phosphate is desirably used in limited quantity and likewise the alkali borate, when such is used. Thus, for example, when in the practical adaptation of my invention the tri-alkali phosphate comprises trisodium phosphate, it is desirably used, whether in the hydrated form ($Na_3PO_4.12H_2O$) or in the dehydrated form ($Na_3PO_4$), in such quantity as to provide from about .03% to about .33% $Na_3PO_4$, by weight in the finished emulsion. Desirably trisodium phosphate will be used in amount such as to provide about 0.1%–0.3%, $Na_3PO_4$, by weight, in the finished emulsion.

When an alkali borate, as sodium borate ($Na_2B_4O_7$), is used, it is desirably used in limited quantity, as for example, in such quantity that from about .22% to about .66% of alkali borate, by weight, will be present in the finished emulsion.

By way of illustrating the practical adaptation of the method embodying my invention, for example, 1050 grams of molten asphalt is gradually run into 446 grams of hot water containing 1 gram of trisodium phosphate, ($Na_3PO_4.12H_2O$), commercial grade and 1 gram soap, with suitable vigorous agitation to effect dispersion of the asphalt, after which the mixture is emulsified, for example, in a colloid mill. The resultant emulsion will contain about 0.03% by weight of $Na_3PO_4$.

As a further illustration, for example, 1000 grams of molten asphalt is added to 488.5 grams of hot water containing 11.5 grams of $Na_3PO_4.12H_2O$, with vigorous agitation, the mixture being emulsified in a colloid mill. The finished emulsion will contain .33% of $Na_3PO_4$, by weight.

As a further illustration, for example, 1000 grams of molten asphalt are added to 475 grams of heated water containing 10 grams of $Na_3PO_4.12H_2O$, 20 grams NaOH, and 5 grams oleic acid, with agitation, emulsification of the mixture produced being effected, for example, in a colloid mill. The finished emulsion will contain about 0.25% $Na_3PO_4$ by weight.

As a further illustration, for example, 1050 grams of molten asphalt are added to 440 grams of water containing 5 grams of $Na_3PO_4.12H_2O$ and five grams of Turkey red oil. The emulsification is effected in the usual manner and the finished emulsion will contain about 0.14% of $Na_3Po_4$, by weight.

As a further illustration, for example, 1050 grams of molten asphalt is added to 445 grams of heated water containing 5 grams of $Na_3Po_4$ and emulsification effected in the usual manner. The finished emulsion will contain about 0.3% of $Na_3Po_4$, by weight.

As a further illustration, for example, 750 grams of molten asphalt is added to 750 grams of water containing 4.5 grams of $Na_3Po_4$ and emulsification effected in the usual manner as, for example, by agitation during the addition of the asphalt. The resultant emulsion will contain about 0.3% $Na_3Po_4$.

As an illustration of the use of an alkali borate, for example, 1200 grams of molten asphalt are added to 487 grams of hot water containing 6 grams of $Na_3Po_4.12H_2O$ and 7 grams of borax. Emulsification is effected in the usual manner and the finished emulsion will contain about 0.15% $Na_3Po_4$ and about 0.22% $Na_2B_4O_7$ by weight. Further, an emulsion may be produced from a mixture of 1100 grams of molten asphalt in 475 grams of water containing 20 grams of borax, 7 grams $Na_3Po_4.12H_2O$ and 2 grams of soap.

In effecting the production of emulsions through the use of the method embodying my invention, it will be understood that the asphalt used will desirably be heated to a temperature such that it will be free flowing, say a temperature of about 120° C. and the water will be heated to about its boiling point. Further, it will be understood that the asphalt will be introduced into the water gradually and desirably in a continuous stream with active agitation of the solution and of the asphalt approximately at its point of entry into the solution, which will result in dispersing the asphalt in a finely divided condition throughout the solution. Emulsification of the mixture thus produced is effected by continued agitation and may be desirably effected, for example, by passing the resultant mixture through a colloid mill, which will disperse the asphalt in minute globules uniformly throughout the solution. It will be understood that emulsification of the asphalt in the water containing a tri-alkali phosphate may be effected in any suitable well known manner.

It will be understood that while I have described my invention in detail, more particularly with reference to tri-sodium phosphates, various other tri-alkali phosphates, as tri-potassium phosphate, tri-ammonium phosphate, etc. may be utilized in place of trisodium phosphate and are contemplated as within the scope of my invention and of the appended claims. Likewise, when an alkali borate is used, such may be potassium or sodium borate, or the like.

In carrying out the method embodying my invention various asphalts, as Trinidad asphalt, still residue, etc. may be used and in addition to a tri-alkali phosphate, the emulsion may contain a protective colloid, as a soap, Turkey red oil, or starch, or the like, or mixtures thereof. Further, it will be noted that the proportions of asphalt to water will be not less than one to one, by weight, and may be from two to three parts of asphalt by weight to one part of water by weight.

As has been indicated, the emulsions produced according to my invention will be readily prepared, and foaming will be avoided. The emulsions produced will be of high stability, may be diluted, and the asphalt residue on drying of the emulsions will have the same properties as the original asphalt.

This application is a continuation in part of the application filed by me July 3, 1928, Serial No. 290,273.

Having now fully described my invention, what I claim and desire to protect by Letters Patent is:

1. The method of producing an asphalt-water emulsion which includes agitating asphalt in a fluid condition with an aqueous solution containing a trialkali phosphate, the trialkali phosphate being present in quantity such that trialkali phosphate will be present in solution in the finished emulsion.

2. The method of producing an asphalt-water emulsion which includes agitating asphalt in a fluid condition with a protective colloid and an aqueous solution containing a trialkali phosphate, the trialkali phosphate being present in quantity such that trialkali phosphate will be present in solution in the finished emulsion.

3. The method of producing an asphalt-water emulsion which includes agitating asphalt in a fluid condition with an aqueous solution containing a trisodium phosphate, the trisodium phosphate being present in quantity such that trisodium phosphate will be present in solution in the finished emulsion.

4. The method of producing an asphalt-water emulsion which includes agitating asphalt in a fluid condition with a protective colloid and an aqueous solution containing a trisodium phosphate, the trisodium phosphate being present in quantity such that trisodium phosphate will be present in solution in the finished emulsion.

5. The method of producing an asphalt-water emulsion which includes agitating asphalt in a fluid condition with an aqueous solution containing a trialkali phosphate and an alkali borate, the trialkali phosphate being present in quantity such that trialkali phosphate will be present in solution in the finished emulsion.

6. The method of producing an asphalt-water emulsion which includes agitating asphalt in a fluid condition with an aqueous solution containing a trisodium phosphate and an alkali borate, the trisodium phosphate being present in quantity such that trisodium phosphate will be present in solution in the finished emulsion.

7. The method of producing an asphalt-water emulsion which includes agitating asphalt in a fluid condition with an aqueous solution containing a trisodium phosphate and borax, the trisodium phosphate being present in quantity such that trisodium phosphate will be present in solution in the finished emulsion.

8. The method of producing an asphalt-water emulsion which includes agitating asphalt in a fluid condition with a protective colloid and an aqueous solution containing a trialkali phosphate and an alkali borate, the trialkali phosphate being present in quantity such that trialkali phosphate will be present in solution in the finished emulsion.

9. The method of producing an asphalt-water emulsion which includes agitating asphalt in a fluid condition with a protective colloid and an aqueous solution containing a trisodium phosphate and borax, the trisodium phosphate being present in quantity such that trisodium phosphate will be present in solution in the finished emulsion.

PRESTON R. SMITH.